United States Patent
Farine et al.

(10) Patent No.: US 6,882,308 B2
(45) Date of Patent: Apr. 19, 2005

(54) PORTABLE DEVICE FOR DETERMINING HORIZONTAL AND VERTICAL POSITIONS AND METHOD FOR OPERATING THE SAME

(75) Inventors: Pierre-André Farine, Neuchâtel (CH); Jean-Daniel Etienne, Les Geneveys-sur-Coffrane (CH)

(73) Assignee: Asulab SA (CH)

( * ) Notice: Subject to any disclaimer, the term of this patent is extended or adjusted under 35 U.S.C. 154(b) by 133 days.

(21) Appl. No.: 10/245,124

(22) Filed: Sep. 17, 2002

(65) Prior Publication Data

US 2004/0054470 A1 Mar. 18, 2004

(51) Int. Cl.$^7$ ............................................. G01S 5/14
(52) U.S. Cl. ........................... 342/357.12; 342/357.14
(58) Field of Search ..................... 342/357.15, 357.13, 342/462, 357.12, 357.14

(56) References Cited

U.S. PATENT DOCUMENTS

| | | | | |
|---|---|---|---|---|
| 5,210,540 A | * | 5/1993 | Masumoto | 342/357.11 |
| 5,265,025 A | * | 11/1993 | Hirata | 701/213 |
| 5,500,835 A | * | 3/1996 | Born | 368/11 |
| 5,646,857 A | * | 7/1997 | McBurney et al. | 701/213 |
| 5,890,090 A | * | 3/1999 | Nelson, Jr. | 701/213 |
| 5,949,812 A | * | 9/1999 | Turney et al. | 375/130 |
| 5,977,909 A | * | 11/1999 | Harrison et al. | 342/357.09 |
| 6,061,018 A | * | 5/2000 | Sheynblat | 342/357.06 |
| 6,133,874 A | * | 10/2000 | Krasner | 342/357.15 |
| 6,205,377 B1 | * | 3/2001 | Lupash et al. | 701/13 |
| 6,529,827 B1 | * | 3/2003 | Beason et al. | 701/213 |
| 6,552,681 B1 | * | 4/2003 | Hayward et al. | 342/357.06 |

* cited by examiner

Primary Examiner—Gregory C. Issing
(74) Attorney, Agent, or Firm—Richard K. Robinson; Robinson & Post, LLP

(57) ABSTRACT

The portable device (10) is used for determining horizontal and vertical positions. It includes a pressure sensor altimeter (15) calibrated to a predetermined initial altitude, a GPS signal receiver (12) arranged to receive, via an antenna (11), signals originating from several satellites (20) in order to calculate position data of the device, a processing unit (14) receiving the position data from the receiver (12) and an altitude value from the altimeter (15), and display means (16) for the horizontal and vertical positions of the device processed and provided by the processing unit. The processing unit sends the GPS receiver a signal corresponding to the altitude value of the calibrated altimeter to enable the receiver to determine, using the altitude value, the position data of the device. A memory (13) including cartographic data and associated with the GPS receiver (12) can provide the precise data to the processing unit (14) in particular for calibrating the altimeter.

16 Claims, 4 Drawing Sheets

PORTABLE DEVICE FOR DETERMINING HORIZONTAL AND VERTICAL POSITIONS AND METHOD FOR OPERATING THE SAME

The invention concerns a portable device for determining horizontal and vertical positions including an altimeter comprising a pressure sensor calibrated to a predetermined initial altitude, a GPS signal receiver arranged to receive signals originating from several satellites in order to calculate position data of the device, a processing unit receiving the position data from the receiver and an altitude value for the altimeter based on pressure measurements of the pressure sensor with respect to the predetermined altitude, and means for displaying the processed horizontal and vertical positions of the device, provided by the processing unit. The device is powered by a low power consuming battery or accumulator.

The invention also concerns a method for determining the horizontal and vertical positions for operating said device.

The invention also concerns a use of the device for evaluating meteorological conditions.

The altimeter can be calibrated owing to the data supplied by the GPS receiver in accordance with a known geographical point stored, for example, in a memory that can be associated therewith.

Once calibrated, the pressure sensor is capable of supplying pressure variation measurements to be able to give the altitude precisely over a period of time also determined as a function of the meteorological conditions, for example, if the device is used for a hike.

Currently, knowledge of one's precise geographical position in all types of activities, whether they be, for example professional or during leisure time, has become a need for the majority of people. This need has been especially felt since the development of GPS type positioning devices, which have been made available to the public. These public devices used to provide positioning data to the user within a tolerance range that was ±150 m in altitude and ±100 m on the horizontal, even if, in military applications, much better accuracy has been obtained. However, this tolerance range has currently been reduced by removing selective jamming.

It should be noted that these X, Y and Z inaccuracies were due, amongst other things, in part to SA (Selective Availability) jamming, i.e. to deliberate degradation generated by the GPS system supplier, and by the passage of radio waves transmitted by the satellites through the ionosphere generating flickering. This passage through the ionosphere gives an altitude error of ±50 m.

By way of information, it should be known that each satellite transmits a specific code (Gold code) at regular intervals precisely defining its position. All the satellites send their own code at the same time each clocked by a calibrated atomic clock. It can happen, however, that a slight time interval can appear between one or other of the clocks, since they have not been calibrated at the same time prior to each satellite being sent into orbit. However, these time intervals are insignificant with respect to the calculated position errors of the GPS systems made available to the public.

Any GPS receiver can receive signals originating from satellites in orbit whose distance from the earth can be between 20,000 km, when one of the satellites is at the Zenith, and 26,000 km, when one of the satellites is at a tangent point with the Earth's surface.

For more ample detail as to the determination of a position using GPS signals, the reader may refer to the article by Mr Pierre-Yves Gillieron published in the Flash Informatique n°FI5 of 9 Jun. 1998 (Bulletin SSC n°28 of 1998).

The combination of an altimeter with a GPS receiver in such a device gives the advantage of providing more precise altitude values than those calculated solely by the GPS receiver as a function of the radio waves that it has received, provided that the altimeter was previously calibrated to a known altitude.

By way of example and with reference to FIG. 1, U.S. Pat. No. 5,210,540 discloses such a device for determining the horizontal position X, Y and altitude Z. In order to do this, device 1 includes a GPS receiver 3 receiving at an antenna 2 radio waves 2a transmitted by several satellites, a pressure sensor altimeter 4 calculating an altitude value as a function of a pressure measurement, a processing unit 5 receiving position data from GPS receiver 3 and altimeter 4 in order to process the received data so as to be able to display a position in X, Y and Z on a display means 9, and storage means 6 including cartographical data. A calibrator 7 is provided in processing unit 5 so as to be able to calibrate the altitude provided by the altimeter in order to be able to use this reference value for subsequent position determination. In such case, the GPS receiver calculates only the data corresponding to the X and Y positions, and thus passes from a three-dimensional mode to a two-dimensional mode.

One drawback of such a device which is intended to be fitted to a vehicle for the purpose of giving navigation information essentially lies in the fact that it consumes a great deal of electric energy. Nonetheless, this device can perfectly well be powered by the vehicle's battery without thereby adversely affecting the energy supply to the other electric parts of the vehicle. However, this device cannot be used in low power consuming apparatus, such as a portable telephone or a wristwatch.

No precautions are therefore taken as to the electric power consumption of the device, which means that such devices are usually provided with 32-bit microprocessors for example in order to be able to improve the calculating operations and reduce the calculation time. It should be noted that the GPS receiver has to perform multiple iterations in order to calculate position data, for example from 10 to 15 iterations. However, no means are provided to facilitate the microprocessor calculation operations.

As for the aforecited example, U.S. Pat. No. 5,646,857 discloses a portable device which includes a GPS type receiver combined with an altimeter, particularly, with a pressure sensor, capable of providing altitude data to the GPS receiver in order to calculate the X, Y and Z position. The provision of a calibrated altimeter value to the receiver improves the accuracy of determination of the horizontal and vertical positions while taking account of quality factors linked to the value provided by the altimeter and to the received radio-frequency signals. This provision of the altimeter value to the receiver is mainly useful in the case in which the GPS signals are noisy and uncertain, or in the case in which the number of satellite signals received is insufficient. This device can thus operate in three-dimensional mode or in two-dimensional mode using the altimeter.

However, as for the first example, account is not taken of the significant power consumption of the microcontroller, which is generally of the 32-bit type in the calculating operations, which is a drawback in the case in which the device is powered by a low power consuming battery or accumulator. Consequently, this portable device cannot be fitted to a timepiece or a portable telephone. Moreover, it is only the accuracy of the position data which is significant in this device, but not the fact of reducing the calculating time or avoiding having to carry out multiple iterations in the case of a problem of "limit cycles".

One object of the present invention is to provide a device for determining horizontal and vertical positions wherein a pressure sensor altimeter calibrated to a predetermined initial altitude for measuring altitude is used to facilitate the calculating operations of the GPS receiver in order to overcome the drawbacks of the devices of the prior art. The altitude of the calibrated altimeter thus allows a precise altitude value to be provided to the GPS receiver, to reduce the calculating time of the receiver and consequently, the power consumption of the device.

Another object of the invention also consists of a method for determining horizontal and vertical positions for operating said device.

Another object of the invention also consists of the use of the device in order to be able to evaluate meteorological forecasts.

These objects, in addition to others, are achieved by the device described hereinbefore which is characterised in that the processing unit sends the GPS receiver a signal corresponding to the calibrated altimeter altitude value to allow the calculating time of a low power consuming microcontroller of the receiver to be reduced in order to determine, using the altitude value, the position data of the device.

These objects, in addition to others, are also achieved by the method for operating the device defined hereinabove which is characterised in that it includes the steps of calibrating the pressure sensor altimeter to a predetermined initial altitude using data processed and provided by the processing unit, transmitting a calibrated altimeter altitude value to the processing unit, sending a signal corresponding to the calibrated altimeter altitude value from the processing unit to the GPS receiver in order to reduce the calculating time of a microcontroller of the receiver in order to determine, using the altitude value, position data as a function of radio waves received from several satellites, and transmitting the position data calculated by the receiver to the processing unit so that they are processed and displayed on display means.

Finally, these objects, in addition to others, are also achieved by the use of the device for evaluating meteorological conditions which is characterised in that the pressure sensor altimeter calibrated to a predetermined initial value is arranged to provide, at an equivalent altitude to an altitude stored in a preceding period of time, pressure variations converted into altitude variations transmitted to the processing unit so that it determines meteorological conditions to be displayed.

One advantage of the device for determining horizontal and vertical positions according to the invention lies in the fact that it consumes little electric energy owing, in particular, to the reduction in calculating time in the GPS receiver with the aid of the precise altitude data provided, in a feedback loop, by the processing unit on the basis of the precise altitude value originating from the calibrated altimeter, and to the use of low power consuming microprocessors, such as 8-bit microprocessors.

If a precise altitude value is brought to the receiver by the feedback loop originating from the processing unit, the receiver will thus make fewer iterations in the calculating operations to converge more quickly on the position data to be provided to the processing unit.

Given the use of such 8-bit microprocessors, it may happen that in the absence of the provision of the precise altitude value originating from the altimeter, the multiple iterations of the calculating operations lead to imprecise determination of the horizontal and vertical positions. This imprecision arises from the "limit cycle" phenomenon where the device converges on a false value for example in the case in which a clock pulse has been lost during the calculation. This phenomenon is well known in the electronics field.

The calculating error provides an erroneous result which may be much greater than the inherent imprecision of GPS receiver devices, for example an error greater than ±150 m for a vertical position. By facilitating the receiver's calculation operations by adding the precise altitude value, a quicker convergence on the solution thus prevents this limit cycle phenomenon.

The low electric power consumption thus allows integration of all the elements of the device to be envisaged, powered by a battery or accumulator for low currents, in a timepiece, such as a wristwatch, or even in an apparatus of small size, such as, for example, a portable telephone.

Another advantage of the device according to the invention consists in that it can be used to give meteorological conditions owing to the pressure sensor altimeter. Since the altitude of the starting point is known precisely, provided by data stored in the memory or by stored altitude values from the previously calibrated altimeter, the variations from the altimeter sensor are used to define the meteorological conditions for the day. If the altimeter indicates +50 m for example, this indicates low pressure, conversely if it indicates −50 m, this means high pressure. Of course, after this information has been displayed on the display means, the altimeter sensor has to be calibrated again to a precise predetermined altitude to be used, as previously described, to the receiver's calculating operations.

The objects, advantages and features of the device and the method for determining horizontal and vertical positions will appear more clearly in the following description of embodiments illustrated by the drawings, in which.

The following description will not describe in detail all the electronic components or units, included in the various parts of said device, which are known to those skilled in the art in the electronics field, but, conversely, will mention schematically said components necessary to elaborate a preferred embodiment of the device according to the invention, as well as these necessary to implement the method for operating said device.

Figure 1:
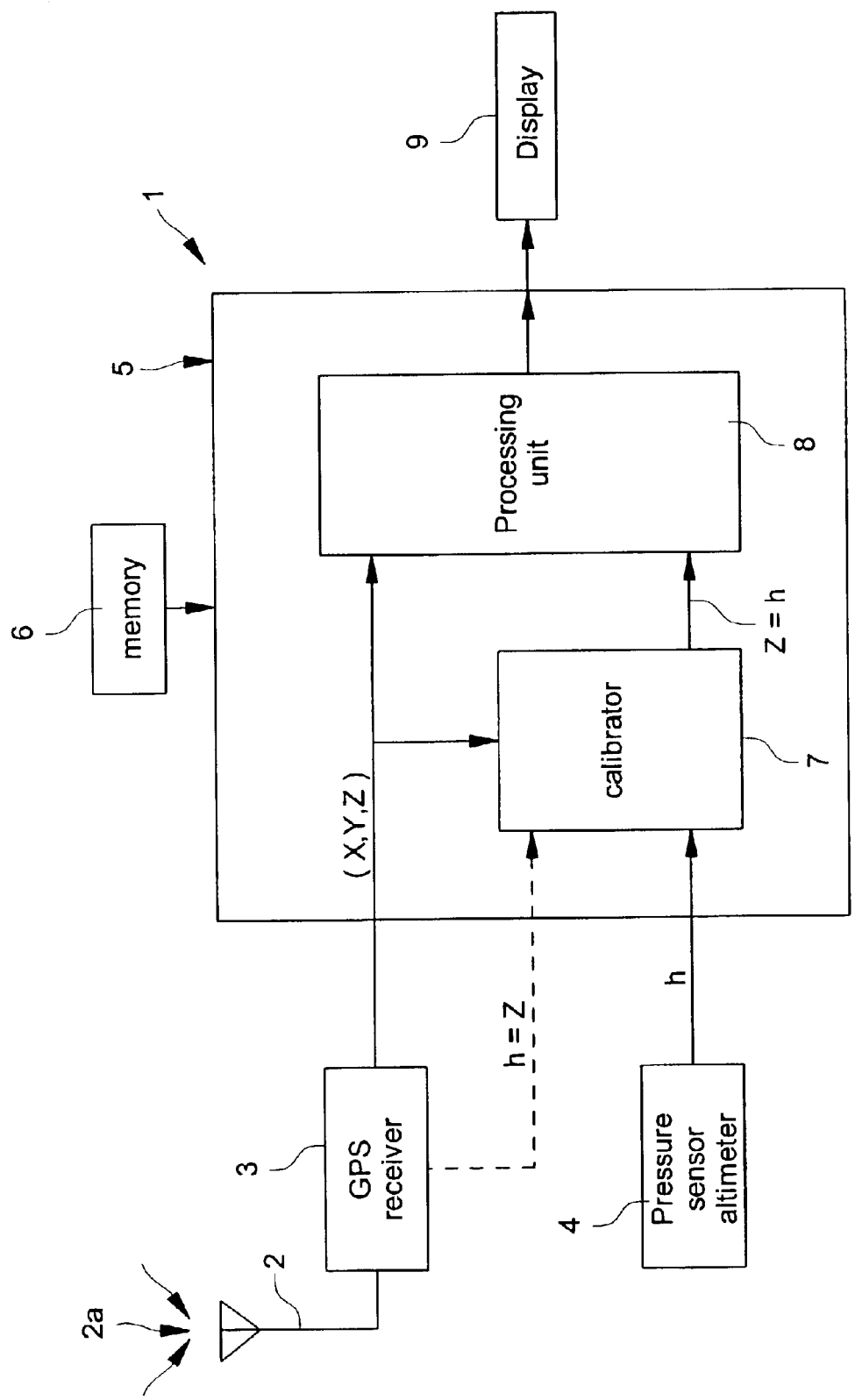
FIG. 1 shows a device for determining horizontal and vertical positions according to the prior art which has been already described hereinbefore.
Figure 2:
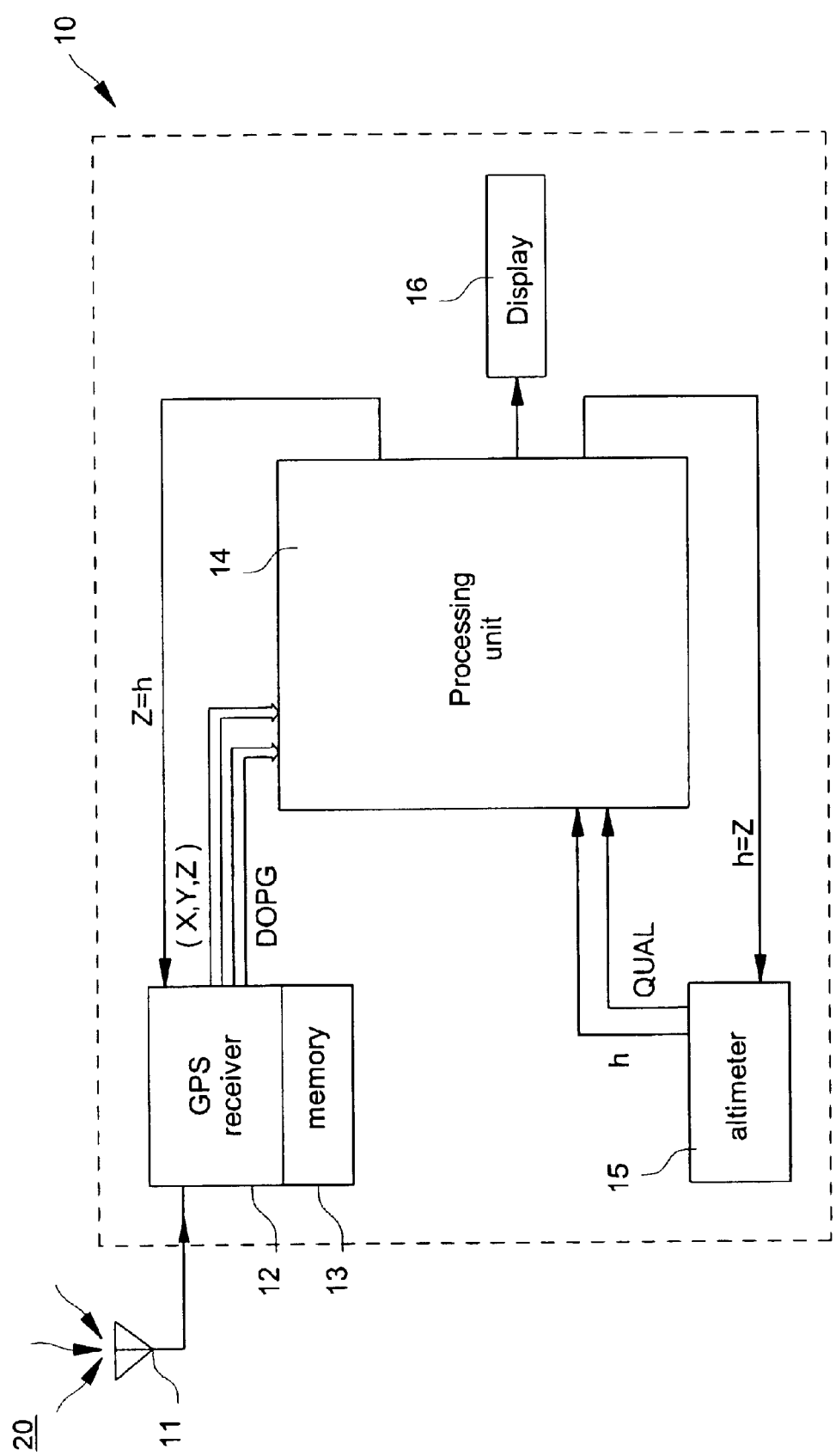
FIG. 2 shows schematically a portable device for determining horizontal and vertical positions according to the invention.

FIG. 2 shows schematically portable device 10 for determining horizontal and vertical positions, i.e. along the X, Y and Z axes. The horizontal positions are generally defined by longitude and latitude, and the vertical position is defined by altitude with respect to sea level.

The portable device can be incorporated in a wristwatch with an electronic time-keeper, in a telephone or another portable apparatus which is easy to carry. In this integration, the device is powered by a battery or accumulator for low currents of the watch, telephone or apparatus.

The device includes a GPS receiver 12 which receives, at an antenna 11, radio waves originating from several satellites 20, cartographic data storage means 13 associated, in this case, with GPS receiver 12, a pressure sensor altimeter 15 for measuring pressure variations converted into an altitude value, a processing unit 14 receiving data to be processed from the receiver and altimeter, and display means 16 for displaying at least the horizontal and vertical positions processed by the processing unit.

In the case in which device 10 is incorporated in an analogue or digital display wristwatch, all of the aforecited components are fixed onto a common support which is a printed circuit board with metal paths connecting each component formed on one or two faces of an insulating substrate and connecting the battery for the electric power supply. The support carrying all of the components is housed in the watchcase leaving at least one aperture towards the exterior for measuring pressure with the aid of the altimeter sensor.

Three satellites are sufficient for precisely determining the horizontal and vertical positions of the device provided that the clock of receiver 12 is synchronised with that of the atomic clocks of said satellites. If not, the receiver has to be linked to at least four satellites, the fourth allowing the receiver's time base to be updated, i.e. its inner clock to be synchronised.

This leads to a resolution of, for example, four equations at four unknowns (X, Y, Z; t) with the signals received from the four satellites.

Position determination is relative to determination of the time intervals between the radio signals received by the receiver of each of the four satellites questioned which have each transmitted at the same time their specific message with their ephemerides (Gold code). The reception time of each radio signal thus determines the distance from the point of reception to the corresponding satellite since the code received from each of the satellites contains the data as to its position in orbit.

By way of indication, the time taken by the signal from the satellite to the receiver multiplied by the speed of light gives the distance which separates the receiver from the satellite, which, using four satellites, allows the position of the device to be deduced with respect to said satellites.

In a first phase, altimeter 15 of device 10 has to be calibrated precisely at a predetermined altitude h in order to be able to be based on the precise altitude value given by the altimeter in particular for the receiver's calculating operations when the device is used as will be explained in more detail hereinafter with reference to FIG. 3.

The pressure sensor used in altimeter 15 can be a piezoresistive sensor of a known type made on a micro-machined silicon element having a membrane, one face of which is exposed to ambient pressure and the other face of which carries resistors arranged in a Wheatstone bridge. Any pressure variation creates an imbalance in the bridge giving a voltage variation between the output terminals of said bridge. The sensor may be of the AM761 type, which is marketed by the Intersema Sensoric Company in Bevaix, Switzerland.

At the moment of leaving for a hike, the pressure sensor altimeter is thus calibrated to a predetermined altitude, which usually comes from GPS receiver 12 in association with precise cartographic data for a region in which the device is used, stored, for example, in a memory 13. The known precise altitude of the starting location extracted, for example, from memory 13 is sent to a processing unit 14, which sends it to pressure sensor altimeter 15 for a calibrating operation.

A comparison is normally made between the position data calculated by the GPS receiver and the precise data of several points of reference on a geographical map stored in said memory. If the horizontal position (X, Y) or the horizontal and vertical positions (X, Y, Z) correspond to a precise stored item of data, then at least the precise altitude value extracted from the memory is transmitted to the unit to calibrate the altimeter.

Memory 13 used in association with GPS receiver 12 is, for example, an EEPROM memory. In this memory, it is possible to programme into said memory, via electric means, cartographic data of a determined region in order to have the precise X, Y, Z values of a starting location or during a trip, or also level curves. Usually, it is the Z data of a precise location which is sent to processing unit 14 by receiver 12.

Instead of having the memory fixed onto the support common to all the other components of the device, one may envisage providing a memory in modular form dedicated to a specific region. A change of region would thus involve changing memory module.

Of course, the altimeter can also be calibrated to a predetermined altitude in a different manner to that described hereinbefore, for example by introducing the altitude value using a keyboard or by downloading directly into the processing unit.

Once calibrated, altimeter 15 is intended to take pressure measurements converted into altitude data relative to the predetermined altitude after calibration during the hike and as a function of the meteorological conditions, i.e. during a period, for example of 5 to 6 hours, when said conditions do not vary too much. By way of indication, a variation of 10 hectoPascal of pressure change corresponds to a difference in altitude of 100 m.

The precise altitude value h of calibrated altimeter 15 is transmitted to processing unit 14 which sends a signal corresponding to this precise altitude value to GPS receiver 12 in order to facilitate its horizontal and vertical data calculating operations as explained hereinbefore. Taking account of the altitude of altimeter 15 allows thus to reduce the receiver's iterations for calculating X, Y (longitude and latitude) and Z position values.

After calibrating the sensor of altimeter 15, device 10 can then provide on the display means and upon demand, for example by pressing a dedicated control button of the device, or automatically at regular intervals, the altitude value Z or h, and the X and Y (longitude and latitude) positions, via the data from receiver 12 supplied to processing unit 14.

As can be seen in FIG. 2, the signals transmitted to processing unit 14 originating from GPS receiver 12 and from altimeter 15 also include quality parameters or a quality factor of the transmitted data.

From receiver 12, quality parameters called DOPG defining a generalised reduction in precision are transmitted at the same time as the position data (X, Y, Z). These parameters are also extracted from the signals received from satellites 20 where they can be broken down for example into HDOP for the horizontal position and VDOP for the vertical position. These parameters enable the processing unit to know the precision of the position data calculated by the receiver. If this factor has a value of 20, this means that precision is poor, however if the factor is close to 1, this means that precision is good. The processing unit transmits this additional data to be displayed onto display means 16 to inform the user of the device as to the quality of the measurement carried out.

From altimeter 15, the quality factor QUAL is transmitted at the same time as altitude value h to the processing unit. This factor may be, for example, representative of the altitude precision provided by the altimeter as a function of the time that passes since the preceding calibration of the pressure sensor of said altimeter 15. It has a value of 1 just after calibration and decreases in a quasi-linear manner as a function of the time that passes in a period of 5 to 6 hours as indicated hereinbefore.

In the processing unit, a comparison is carried out between quality parameters DOPG and factor QUAL. Following this comparison, if factor QUAL is less than the altitude parameter of parameters DOPG, the processing unit can decide whether it is necessary to recalibrate the sensor so that it can provide thereafter an altitude value based on a new predetermined altitude to the GPS receiver for all the subsequent position calculating operations.

It should be noted that the horizontal precision will also remain at ±100 m even if the altitude is very precise. Nonetheless, owing to the feedback loop of the altitude value from the sensor, the duration of the receiver's calculating operations is greatly reduced, hence a limited power consumption for the receiver.

At any moment, during a hike, X, Y positions calculated by GPS receiver 12, as well as the precise altitude value, can be stored in memory 13 in order to increase the number of listed geographical place reference points.

Device 10 can also be used to evaluate meteorological forecasts. At the same known and stored altitude, any pressure variation of the pressure sensor of altimeter 15 with respect to a pressure value of a preceding calibration can reflect barometrical tendencies. In this case, the processing unit will take the altitude value transmitted by the altimeter and compare it to a preceding value stored at the same altitude.

If the variation in the altimeter's altitude value is positive, this means tendency towards low pressure. If the variation in the altimeter's altitude value is negative, this means tendency towards high pressure.

This information processed by the processing unit can be displayed by the device to give an indication as to the meteorological conditions to its user before setting off for a hike and before having to calibrate the altimeter again to a precise stored altitude. By way of information, reference can be made to European Patent Application No. 0 670 532 by the Applicant disclosing a "weather watch".

A climatic variation is measured between 0.6 and 1.6 mbar/h between a low and strong climatic disturbance, whereas the measurement of a variation in altitude is of the order of 30 mbar/h for an altitude of 300 m which may be much greater than the climatic variation during a hike. Once calibrated and for a long part of the day, the altitude given by the altimeter can be considered to be precise even with a slight influence of the climatic variation. However, after one day and before another hike, climatic variations can be checked by the unit for the weather forecast for the coming day.

Figure 3:
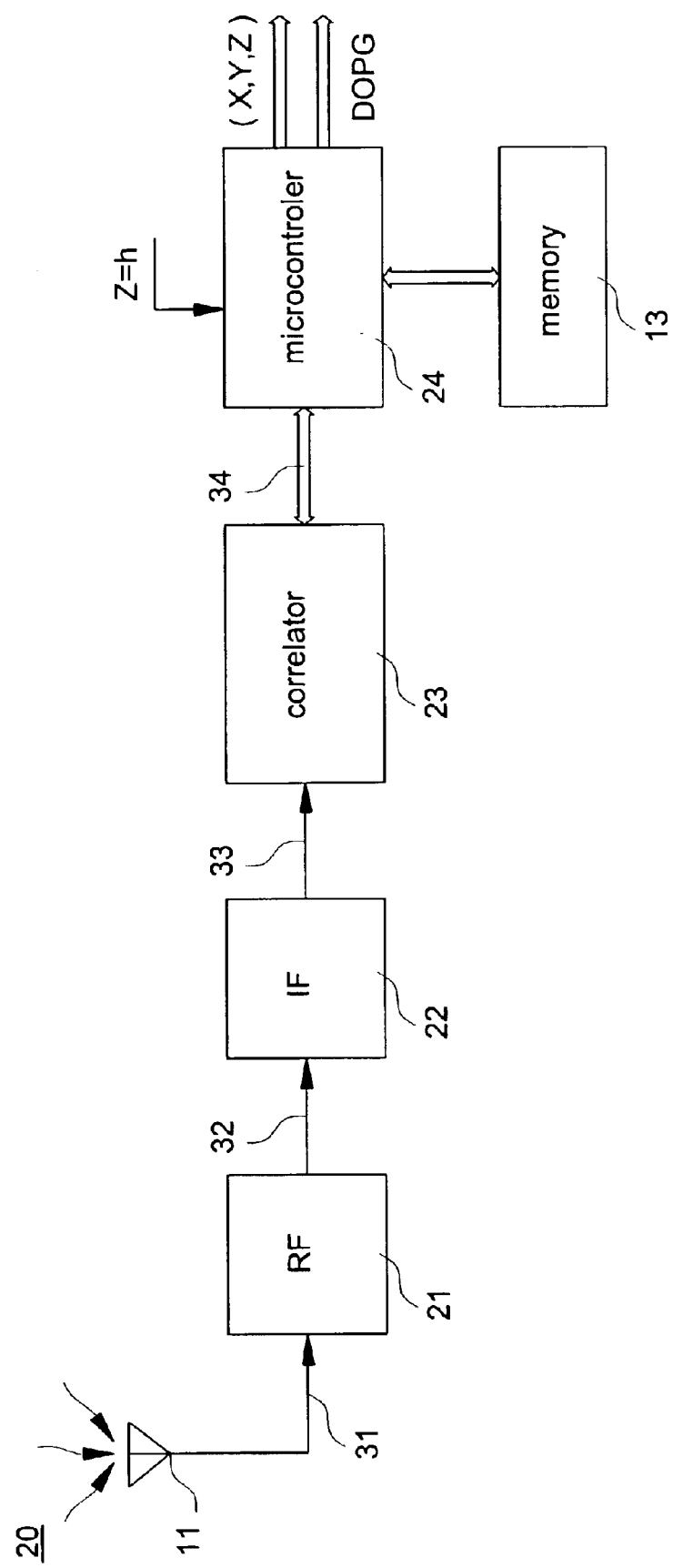
FIG. 3 shows in more detail the GPS receiver and the memory associated therewith of the device of FIG. 2.

FIG. 3 shows in more detail the electronic units of the GPS receiver associated with storage means, such as an EEPROM memory 13 described previously with reference to FIG. 2.

Said receiver includes an antenna 11 for receiving the radio signals having a carrier frequency of 1,57542 GHz originating from several satellites 20, a first radio-frequency conversion circuit 21 receiving signals 31 from antenna 11 to carry out a frequency demultiplication of signals 31 to provide signals 32 at a frequency of the order of 180 MHz, a second conversion circuit 22 receiving signals 32 to carry out a frequency demultiplication of signals 32 to provide signals 33 at a frequency of the order of 4 MHz, a correlator 23 receiving signals 33 and including a series of demultiplication stage in order to be able to extract the specific codes of each satellite from the radio signals received at the antenna, an 8-bit microcontroller 24 in communication with correlator 23 via lines 34 for receiving the information from said correlator and giving said correlator instructions.

The data transmitted by lines 34 of correlator 23 to microcontroller 24 are normally at a frequency of 50 Hz, whereas the microcontroller operates with a clock signal of the order of 8 MHz and also allows synchronisation of correlator 23. As described hereinbefore, this time base has to be synchronised with the time base of the satellites.

Since the first radio-frequency conversion circuit 21 consumes more electric energy than the other components of said receiver, it is only switched on for the reception of each radio signal and transmission to the second conversion circuit.

Each specific satellite code modulated on the carrier frequency of 1,57542 GHz is called a Gold code. This code is a code at a frequency of 1,023 MHz (1023 bits) which is repeated every millisecond (1 ms).

Upon reception of the GPS signal, in addition to the useful signal, a much greater amplitude noise (+20 dB) surpasses the signal which one wishes to extract from the GPS signals. It is thus necessary to know what the shape of the signal has to be upon reception to be able to correlate the received signal with a known useful signal in correlator 23 and as soon as equivalence appears, one knows which is the clear satellite signal having removed or filtered the noise. The known signal is stored in microcontroller 24, which sends it to correlator 23 to find such equivalence.

Microcontroller 24 also controls correlator 23 to instruct it to link itself to such and such a satellite according to such a channel insofar as communication can take place. If, upon the microcontroller's demand, a satellite cannot be reached within an interval of time, microcontroller 24 gives another order to correlator 23 in order to be able to be linked to another of the available satellites. The higher the number of satellites interrogated, the higher the precision, but it is indispensable to have at least four satellites.

Micontroller 24 receives the precise altitude value Z=h from the processing unit in order to facilitate the receiver's calculating operations and thus converge more quickly on the solution. After determination of the horizontal and vertical positions, a comparison is carried out with the data stored in the memory in order to detect whether the precise data stored correspond to those calculated by the receiver. The position data (X, Y, Z), and the quality parameters DPOG are transmitted to the processing unit in order to be processed and displayed on the display means.

The 8-bit micrcontroller can be that marketed under the name of CoolRISC-816 by EM Microelectronic-Marin SA in Switzerland.

Figure 4:
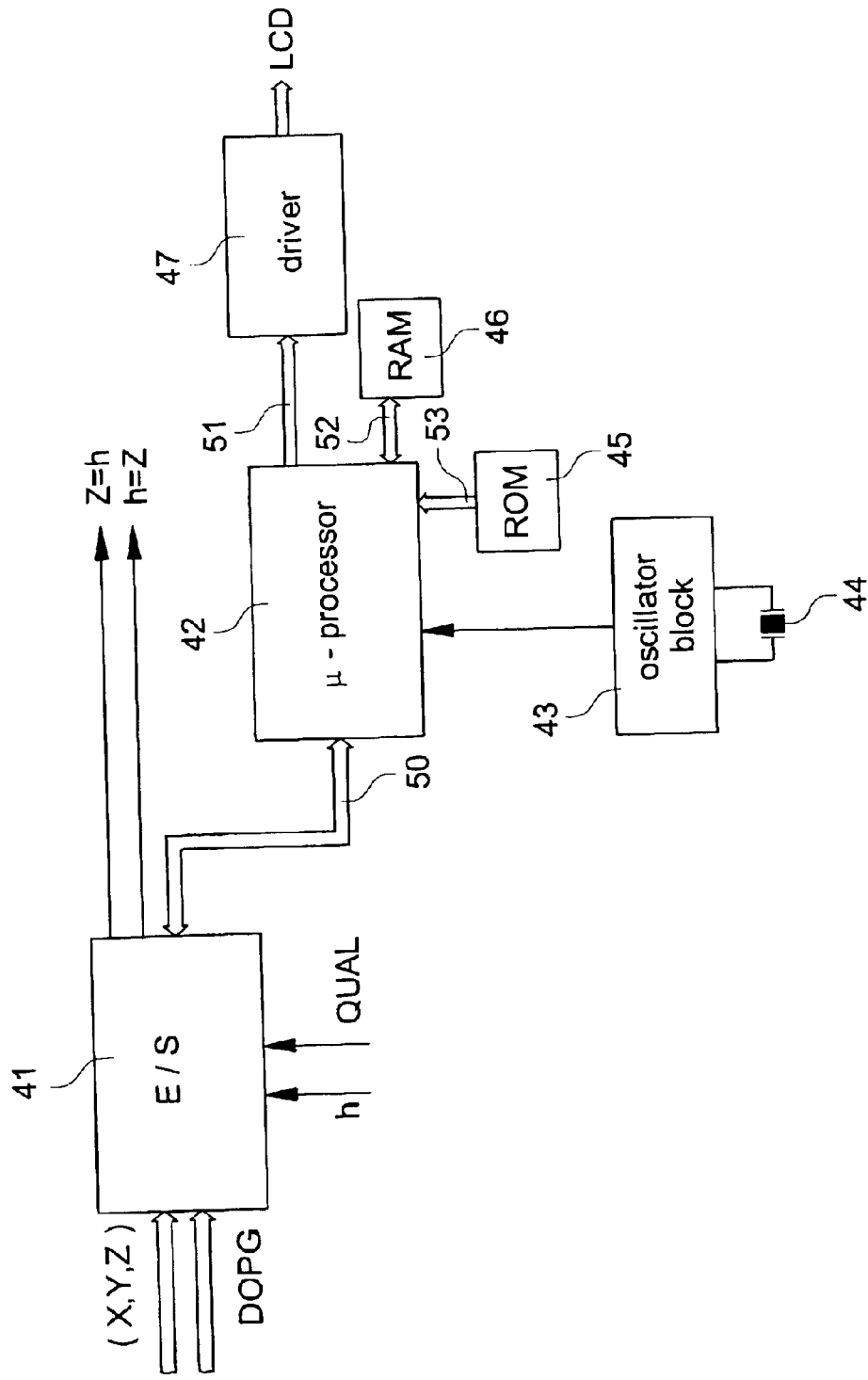
FIG. 4 shows in more detail the processing unit of the device of FIG. 2.

With reference to FIG. 4, the processing unit for controlling the data received from the receiver and the altimeter, which includes an 8-bit microcontroller, is presented in more detail. It includes an input and output unit 41 receiving the data from the receiver and from the altimeter and supplying at output data on the one hand h=Z for the altimeter and on the other hand Z=h for the receiver, a microprocessor 42 clocked at a frequency of 32 kHz by a quartz 44 oscillator unit 43 and in communication, via lines 50, with unit 41, a ROM programme memory 45 connected, via lines 53, to microprocessor 42, a RAM data storage memory 46 in communication, via lines 52, with microprocessor 42, a drive circuit 47 for display means, such as a liquid crystal display, receiving data, via lines 51, from microprocessor 42.

Input and output unit 41 receives position data (X, Y, Z) from the GPS receiver, position data quality parameters DOPG, altimeter altitude value h, and altimeter quality factor QUAL. In this unit controlled by microprocessor 42, a comparison circuit, particularly between quality parameters DOPG and quality factor QUAL as described hereinbefore can be provided.

There may be stored in RAM memory 46 for example altitude values received from the calibrated altimeter or from the receiver, in order also to be able to be used for meteorological forecasts to be displayed.

The microprocessor is advantageously an 8-bit PUNCH microprocessor provided by EM Microelectronic-Marin SA in Switzerland.

If the device is incorporated in a timepiece, oscillator unit 43 with crystal 44 is also used as a time base for the horological functions.

From the description which has just been given, multiple variants can be conceived without departing from the scope of the invention, in the light of the knowledge of those skilled in the art. For example, instead of connecting the memory, which includes the cartographic data, to the receiver, one may envisage connecting it to the processing unit. In these conditions, comparison with the position data calculated by the receiver will occur in the processing unit and not in the receiver.

What is claimed is:

1. A portable device for determining horizontal and vertical positions, said device including a pressure sensor altimeter calibrated to a predetermined initial altitude, a GPS signal receiver arranged to receive signals originating from several satellites in order to calculate position data of the device, a processing unit receiving the position data from the receiver and an altitude value from the altimeter based on pressure measurements of the pressure sensor with respect to the predetermined altitude, and display means for the horizontal and vertical positions of the device processed and provided by the processing unit, said device being powered by a battery or accumulator of reduced size, wherein the processing unit sends, into a low power consuming micro-controller of the GPS receiver a signal corresponding to the altitude value of the calibrated altimeter to enable the calculating time of the micro-controller of the receiver to be reduced by reducing the number of iterations of the device position data calculating operations to prevent the limit cycle phenomenon.

2. A device according to claim 1, wherein storage means including cartographic data for a region are associated with the GPS receiver to enable it to provide the processing unit with precise position data if the position calculated by said receiver corresponds to a geographical point stored in said storage means.

3. A device according to claim 2, wherein the storage means are an EEPROM type non-volatile memory into which the cartographic data is electrically introduced and deleted.

4. A device according to claim 2, wherein the storage means including the cartographic data for a region are incorporated in a module which can be detached from said device in order to be able to change said module as a function of a determined geographical region of use of said device.

5. A device according to claim 1, wherein the receiver and the processing unit each include a low power consuming micro-controller, in particular an 8-bit microcontroller.

6. A device according to claim 1, wherein the operations in the receiver are clocked at clock frequencies higher than one MHz, whereas the operations in the processing unit are clocked at clock frequencies lower than 100 kHz.

7. A device according to claim 1, wherein the receiver, the altimeter, the processing unit and the storage means are fixed onto the same support.

8. A device according to claim 1, wherein it is incorporated in a wristwatch, or in a portable telephone.

9. A device according to claim 1, wherein the receiver is arranged to send the processing unit, in addition to the position data, quality parameters extracted from the radio waves emitted by the satellites so that the processing unit can determine the precision of the position data received from the receiver.

10. A method for determining horizontal and vertical positions for operating the device according to claim 1, wherein it includes the steps of:

calibrating the pressure sensor altimeter to a predetermined initial altitude using data processed and provided by the processing unit, transmitting an altitude value of the calibrated altimeter to the processing unit, sending a signal corresponding to the altitude value of the calibrated altimeter from the processing unit into a low power consuming micro-controller of the GPS receiver to enable the calculating time of the micro-controller of the receiver to be reduced by reducing the number of iterations of the position data calculating operations as a function of the radio waves received from several satellites to prevent the limit cycle phenomenon, and transmitting the position data calculated by the receiver to the processing unit so that they are processed and displayed on display means.

11. A method according to claim 10, wherein the data for calibrating the altimeter to a predetermined precise altitude is drawn from memory means including cartographic data for a region and associated with the GPS receiver for transmission to the processing unit.

12. A method according to claim 10, wherein, in addition to the position data, the receiver transmits quality parameters drawn from the radio waves received from the satellites so that the processing unit can determine the precision of the position data received from the receiver.

13. A method according to claim 12, wherein, in addition to the altitude value, the altimeter transmits to the processing unit a quality factor of said altitude value, and wherein a comparison between the quality parameters of the receiver and the quality factor of the altimeter is carried out in the unit in order to determine the precise horizontal and vertical positions to be displayed.

14. A method according to claim 13, wherein the altimeter is calibrated again to a predetermined altitude if the result of the comparison shows that the quality parameters originating from the receiver are better than the quality factor originating from the altimeter.

15. A method according to claim 10, wherein at the same place whose altitude has been stored, the pressure variations of the altimeter sensor converted into altitude variations are used to determine, in the processing unit, meteorological conditions to be displayed, the altimeter being subsequently calibrated to the stored altitude.

16. An use of the device according to claim 1 for evaluating meteorological conditions, wherein the pressure sensor altimeter calibrated to a predetermined initial altitude is arranged to provide, at an equivalent altitude to an altitude stored in a preceding period of time, pressure variations converted into altitude variations transmitted to the processing unit so that it determines meteorological conditions to be displayed.

* * * * *

UNITED STATES PATENT AND TRADEMARK OFFICE
CERTIFICATE OF CORRECTION

PATENT NO. : 6,882,308 B2  
DATED : April 19, 2005  
INVENTOR(S) : Farine et al.

It is certified that error appears in the above-identified patent and that said Letters Patent is hereby corrected as shown below:

<u>Title page,</u>
Item [30], Foreign Application Priority Data, please insert
-- March 22, 2000     (EP) Europe ……………………….. 00201021.3 --

Signed and Sealed this

Fifth Day of July, 2005

JON W. DUDAS
*Director of the United States Patent and Trademark Office*